United States Patent
Nasiri et al.

(10) Patent No.: US 7,298,708 B2
(45) Date of Patent: Nov. 20, 2007

(54) IP DEVICE REGISTRATION

(75) Inventors: Katayoun Nasiri, Kanata (CA); Monique Zellerer, Stittsville (CA)

(73) Assignee: Mitel Knowledge Corporation (CA)

( * ) Notice: Subject to any disclaimer, the term of this patent is extended or adjusted under 35 U.S.C. 154(b) by 1072 days.

(21) Appl. No.: 10/229,706

(22) Filed: Aug. 28, 2002

(65) Prior Publication Data

US 2004/0042461 A1 Mar. 4, 2004

(51) Int. Cl.
H04L 12/28 (2006.01)
(52) U.S. Cl. .............. 370/254; 370/356; 370/400; 709/200
(58) Field of Classification Search .............. None
See application file for complete search history.

(56) References Cited

U.S. PATENT DOCUMENTS

| | | | |
|---|---|---|---|
| 6,775,273 B1 * | 8/2004 | Kung et al. ............. | 370/356 |
| 6,798,767 B1 * | 9/2004 | Alexander et al. ...... | 370/352 |
| 7,016,675 B1 * | 3/2006 | Schuster et al. ........ | 455/433 |
| 7,110,393 B1 * | 9/2006 | Tripathi et al. ......... | 370/352 |
| 2001/0026545 A1 * | 10/2001 | Matsumoto et al. .... | 370/338 |

FOREIGN PATENT DOCUMENTS

| WO | WO 00/31933 | 6/2000 |
|---|---|---|
| WO | WO 02/052827 | 7/2002 |

* cited by examiner

*Primary Examiner*—Chau Nguyen
*Assistant Examiner*—Jung Park
(74) *Attorney, Agent, or Firm*—Jones Day

(57) ABSTRACT

In a method of registering an IP device in a network where one of a plurality of servers in the network has provided to the IP device an IP address for a controller for which the IP device has not been programmed, the improvement comprising accessing a database to obtain a further IP address for a designated controller for which the IP device has been programmed.

4 Claims, 3 Drawing Sheets

1. The case where the current controller is the actual device controller
2. The case where the current controller is not the right controller for that IP device.

IP DEVICE REGISTRATION

FIELD OF THE INVENTION

The present invention relates generally to TCP/IP networks, and more specifically to a method of handling device registration in a TCP/IP network.

BACKGROUND OF THE INVENTION

A DHCP server is a component that uses the Dynamic Host Configuration Protocol (DHCP) to provide configuration information to IP hosts on a TCP/IP network. For example, in IP telephone systems such as the Mitel Networks MN3300 telephone system, DHCP servers are used to provide IP addresses to IP devices that connect to the system. Each MN3300 has its own DHCP server, such that when multiple DHCP servers are connected in clusters (e.g. networked MN3300 systems), problems can occur when registering newly connected IP devices.

When an IP device to be controlled by such a system first connects to the network, it must request configuration information (at a minimum, its own IP address and that of its controller) from a DHCP server. It does so by broadcasting a message referred to as DHCP Discovery. The IP device accepts the first response to its request and ignores any others. Once the device receives the required information from the responding DHCP server, it receives a software download from a TFTP server associated with the responding DHCP server and attempts to communicate with its controller using the DHCP-specified IP address. The TFTP server is a component that uses the Trivial File Transfer Protocol (TFTP) to transfer files (e.g. device software loads) from a storage area to a client (e.g. the device 1).

The DHCP server in a MN3300 system is typically configured to provide the IP address of its co-resident controller as part of the configuration information requested from it by an IP device. The DHCP server has no way of determining whether, in fact, a device making the request 'belongs' to the controller associated with the server. In a multiple or clustered MN3300 network, any DHCP server may respond to any IP device that broadcasts a Discovery request within the network. This results in the IP device being programmed via a software download from the responding MN3300 system. If an IP device receives an IP address for a controller other than the one on which it has been programmed via the software download to be controlled, its attempt to receive service fails.

One approach to overcoming this problem is to turn off all but one DHCP server in a cluster or network. This requires that the DHCP server be configured to use a unique identifier for the device (typically a Media Access Control or MAC address) to map the appropriate configuration information. It further requires that this identifier be pre-programmed (i.e. mapped to one of multiple controllers) in a database accessible to the DHCP server.

A second approach is to provide one MN3300 (hence, one DHCP) per subnet within a network. However, that requires more complex network architecture.

SUMMARY OF THE INVENTION

According to the present invention a method is provided by which a controller (such as a MN3300 controller) is able to determine the designated controller for any IP device that attempts to receive service from it. The method also includes a step of redirecting any such IP device to its appropriate controller.

BRIEF DESCRIPTION OF THE DRAWINGS

A detailed description of the prior art and the preferred embodiment is set forth herein below having regard to the following drawings, in which.

DETAILED DESCRIPTION OF THE PREFERRED EMBODIMENT

Figure 1:
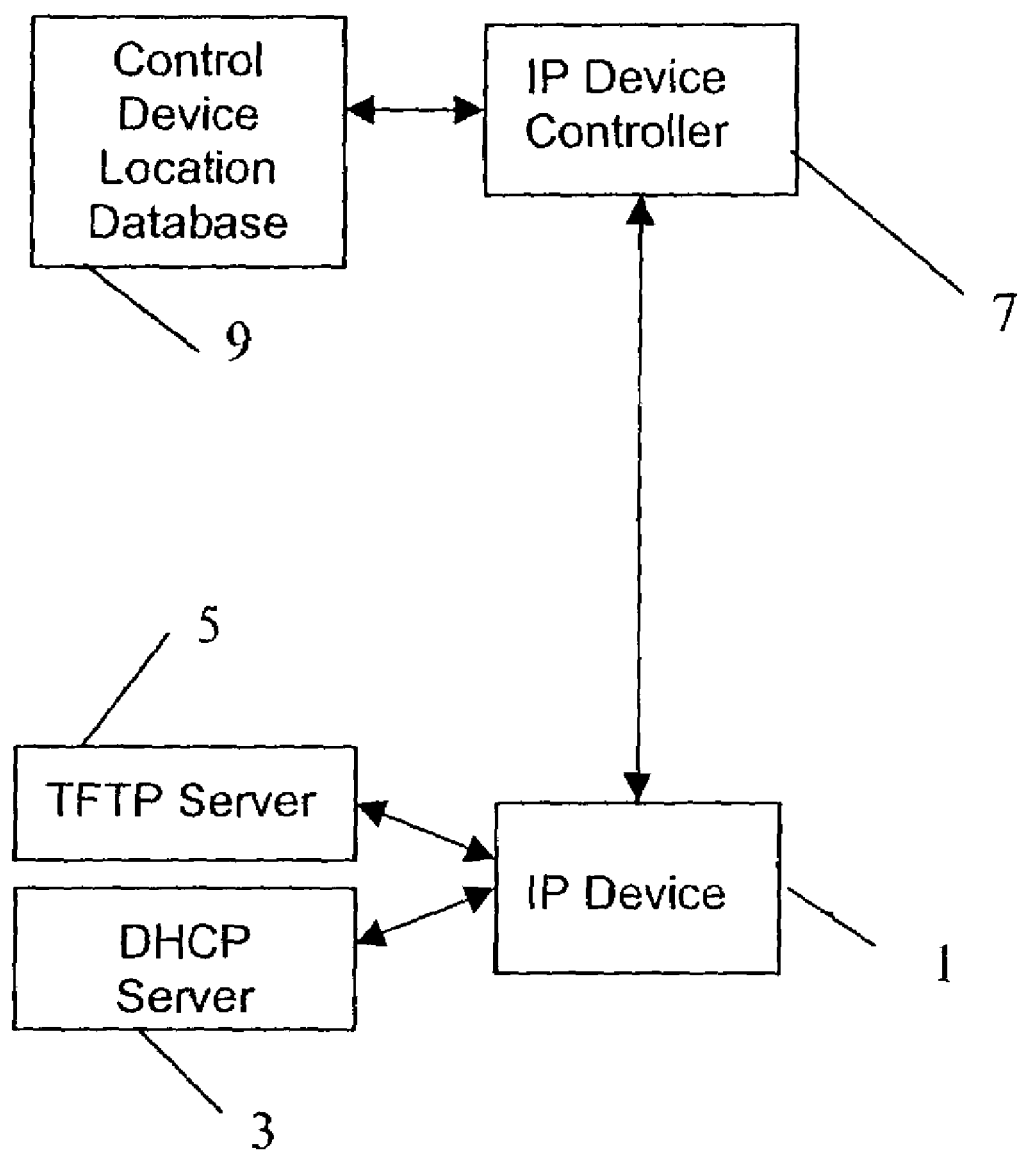
FIG. 1 is a system block diagram of a TCP/IP network in connection with which the method of the invention may be implemented.

FIG. 1 shows a system for registering and controlling an IP device 1 in a network, such as a MN3300-based system. When initially connected, the device 1 must obtain configuration information from a DHCP server 3, including the IP address for the device 1, the IP address of a TFTP server 5 from which the device obtains its software load, and the IP address of its controller 7.

Figure 2:
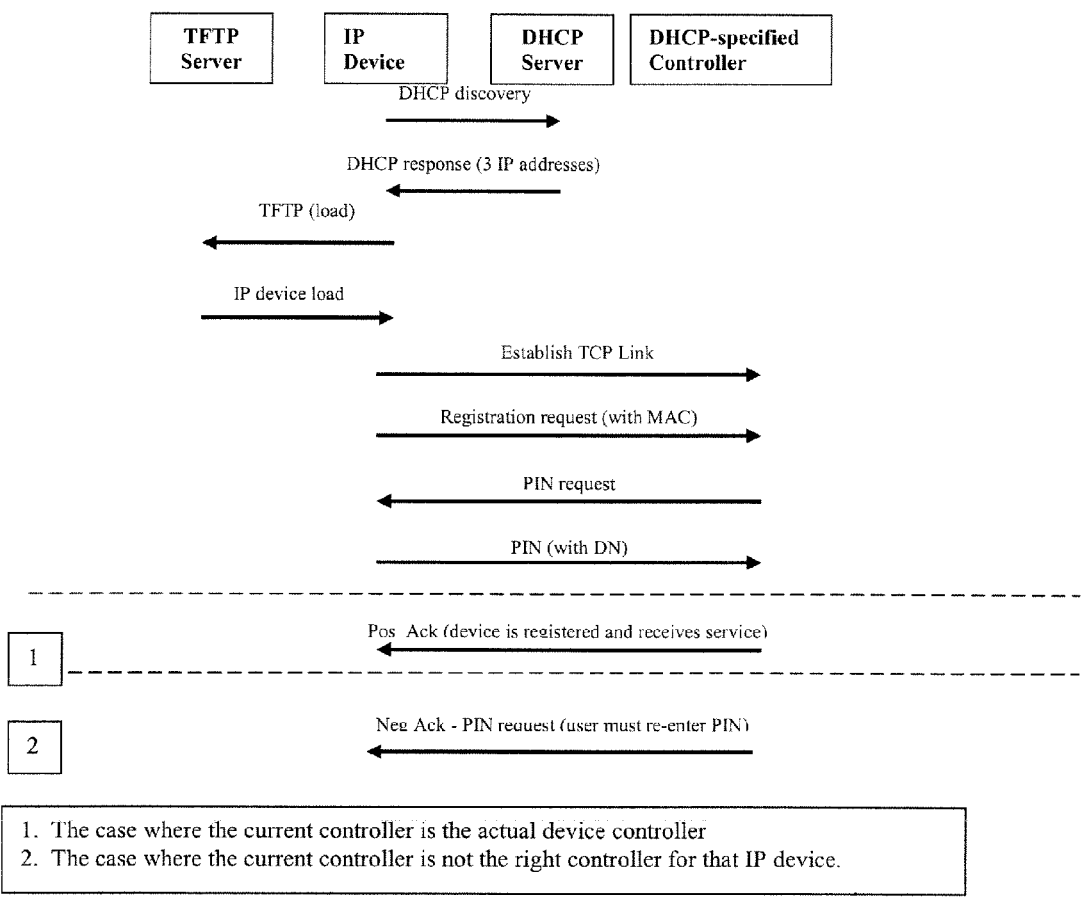
FIG. 2 is a message flow diagram showing IP device registration according to the prior art.

Thus, as shown in FIG. 2, the device 1 periodically broadcasts a DHCP Discovery request until it receives a response. It accepts the first response received and ignores any subsequent responses from other DHCP servers in the network. The IP device 1 then obtains its software load from the TFTP server 5, including MAC address, and execution of its software begins.

The IP device 1 then attempts to 'register' with the controller 7 for which it has received an IP address. This involves establishing a TCP/IP link with the controller and providing it with the programmed MAC address for the device. If the MAC address supplied by an IP device upon registration has not been preprogrammed against a directory number (DN) in the database, then the user of the IP device is prompted to supply a PIN (e.g. the DN preceded by a unique code). The PIN associates the user with a line of service (e.g. DN), programmed in the database 9 of the controller 7. The controller 7 checks to determine whether the DN device "belongs" to it (i.e. the database 9 for the controller 7 contains an entry (DN) for the device 1). If not, the registration attempt is rejected (Neg_Ack requesting re-entry of PIN) and the device does not receive service. The foregoing device registration process is in accordance with the prior art.

Figure 3:
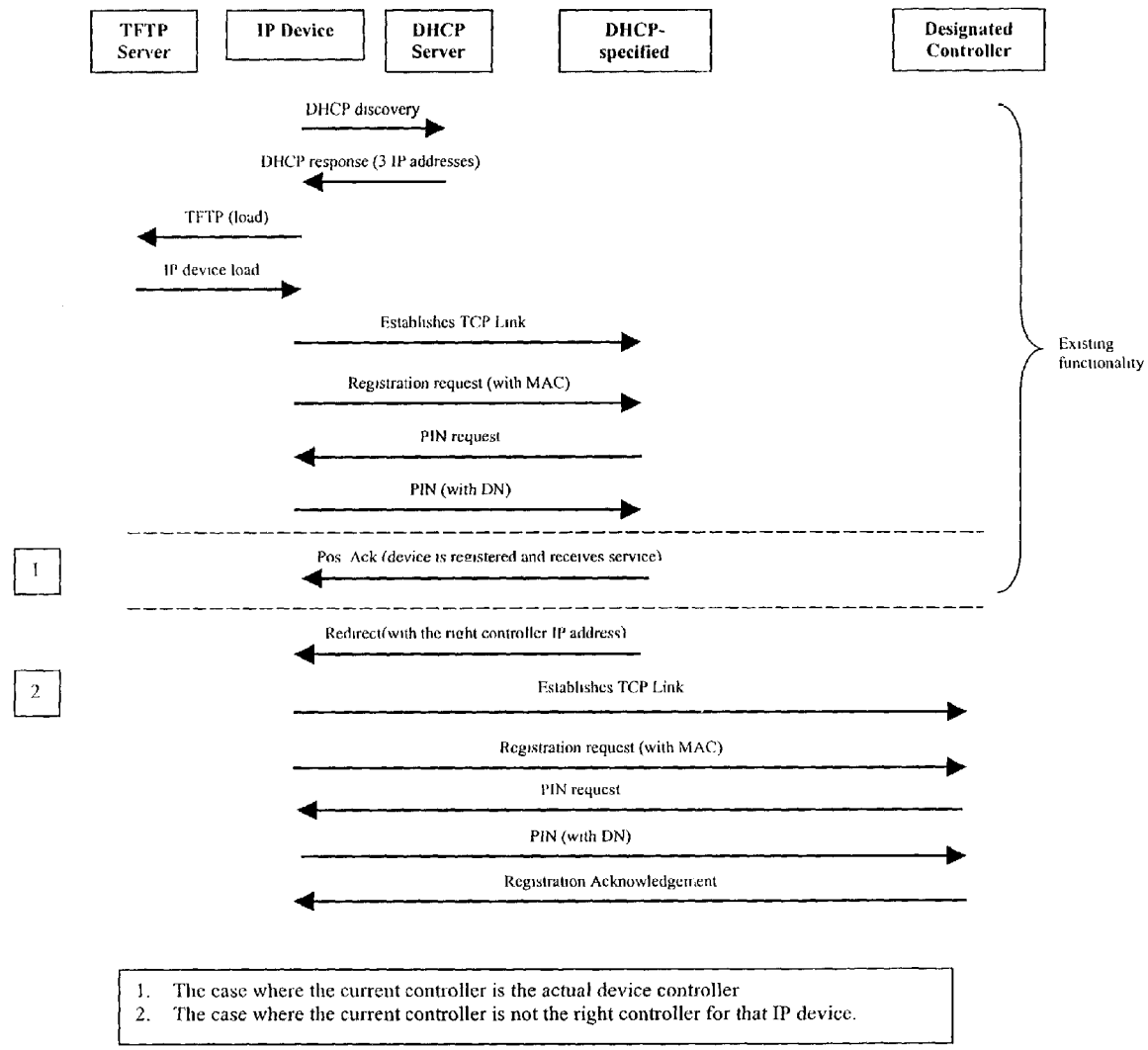
FIG. 3 is a message flow diagram showing IP device registration according to the method of the present invention.

According to the present invention, as shown in FIG. 3, in the event that the controller 7 determines that it is not the assigned controller for the IP device 1, it calls a "send_redirect_reg_req" procedure, as discussed in detail below. This procedure is used to determine whether the device belongs to any other controller in the cluster or network based on the PIN (with the pre-pended code removed). It then obtains the address of the designated (i.e. programmed) controller for that device from its local database 9. Specifically, remote DNs (i.e. DNs programmed for devices on a MN3300 system connected to the same network cluster) may be programmed into the database 9 from the controller 7 using forms accessible via a graphical user interface (GUI). The remote DNs stored on database 9 include a number to identify the designated MN3300 followed by the actual DN. The controller 7 then accesses another locally stored form to map the remote DN to an IP address for the designated controller.

OPS Manager may be used to propagate changes to any DN in the database 9 to all MN3300s in the network, as described in co-owned Canadian Patent No. 2197517 issued Jan. 15, 2002.

If, in fact, the device belongs to the originally designated controller, registration completes and the device receives service (i.e. the device 1 receives a Pos_Ack message, as in FIG. 2). If not, the controller 7 provides the new controller IP address to the device 1 in order to redirect the device to the designated (i.e. programmed) controller. A person of skill in the art will understand the sequence by which the device handles the redirection (i.e. closing the link with the current controller, and opening a new link with the appropriate controller using the new IP address that is received from the current controller). Once a TCP/IP link has been established with the appropriate controller the registration process is repeated and, if successful, the device 1 receives service.

The pseudo-code reproduced below describes the process that accesses database 9 to obtain the remote DNs and sends that information to the IP device 1 for redirecting the device to the designated controller:

The following new routines are used in this process:
get_pbx_ip_address: this routine finds the IP address of the designated controller in the cluster.
format_save_pin_request_to_set send_redirect_reg_req: upon finding the designated controller, this routine sends the IP address to the telephone set (e.g. via a Mitel Viper virtual "card" for mapping IP addresses to devices in legacy systems made prior to the advent of IP addresses.

format_redirect_reg_request_to_set: this routine formats the redirect message.

Prior to calling the Get_pbx_ip address routine, the swid (software id object that includes the DN) is sent by the IP device 1 to the controller 7, as follows:

```
IF((map DN to swid(dn_of_set,device_swid)=success)
    AND
        (device_swid.sw_slctr = sws_remote_dn))
    THEN
        send_redirect_reg_req(new_msg,device_swid);
```

Then, the send_redirect_reg_req procedure is executed. This procedure fulfils two functions. First, it calls the get_pbx_ip_address routine for collecting the IP address of the correct controller. Secondly, it sends a message to the IP device 1 along with the correct controller IP address, for redirecting the device 1 to establish a TCP/IP connection with the correct controller, as discussed above.

```
send_redirect_reg_req
    {
        .
        .
        .
        get_pbx_ip_address(device_swid, pbx_ip_address);
        .
        .
        .
    }
get_pbx_ip_address(device_swid, pbx_ip_address)
    {
        .
        .
        .
        IF the device_swid.sw_slctr is pointing to a remote_DN THEN
            //Access the Remote DN Table in the database 9 and read the specific
            record //using as key the DN contained by the device_swid:
            IF read_table_record(device_swid, rdn_table_entry) = success THEN
                //Create a temporary swid using the cluster element ID in the record
                obtained //from the Remote DN Table above; Access the Cluster Table in
                the //database 9 and read the specific record using as key the cluster
                element //ID:
                temp_swid.sw_slctr := sws_cluster_element;
                temp_swid.cluster_element_id := dn_table_entry.ceid_table_index;
                IF read_table_record(temp_swid, cluster_table_entry) = success THEN
                    //Create a temporary swid using the sws_pbx_signalling ID in the
                    record //obtained from the Cluster Table above; Access the PBX
                    (Controller) //Table in the database 9 and read the specific record using
                    as key the //sws_pbx_signalling ID:
                    temp_swid.sw_slctr := sws_pbx_signalling;
                    temp_swid.pbx_signalling_id:=cluster_table_entry.cluster_element_index-1;
                    IF read_table_record(temp_swid, pbx_entry) = success THEN
                        //Set the pbx_ip_address to the IP address in the record obtained
                        from //the PBX (Controller) Table above:
                        pbx_ip_address := pbx_entry.ip_netwk_sig_ip_address;
                    ENDIF;
                ENDIF;
            ENDIF;
        ENDIF;
        .
        .
        .
    }
```

All the tables exist in the local database and they must get filled through user interfaces (e.g. CDE, ESM, OPS).

Modifications and alternatives of the invention are possible. For example, although the method of the present invention has been described in terms of a networked MN3300 telephone system, it will be appreciated that the method may be applied to any controller capable of handling registration of IP devices. This, and all other such modifications and variations are believed to be within the sphere and scope of the invention as defined by the claims appended hereto.

We claim:

1. A method of registering an IP device programmed for a particular PBX in a network of multiple PBXs connected in clusters, said PBXs including respective servers and controllers, where one of said servers has provided to the IP device an IP address for one of said controllers in a further PBX for which the IP device has not been programmed, the method comprising:

receiving a software ID from said IP device and in response accessing a database to obtain a further IP address for a designated controller in said particular PBX for which the IP device has been programmed, and redirecting said IP device to establish a connection with said designated controller for registering said IP device therewith;

wherein said accessing said database includes reading a first ID from said database using said software ID as a key to identify one of said clusters within said network containing said designated controller; reading a second ID from said database using said first ID as a key to identify one of said multiple PBXs within said one of said clusters containing said designated controller; and reading said further IP address for said designated controller from said database using said second ID as a key.

2. A method of registering an IP device programmed for a particular PBX in a network of multiple PBXs connected in clusters, said PBXs including respective servers and controllers, where one of said servers has provided to the IP device an IP address for one of said controllers in a further PBX for which the IP device has not been programmed, the method comprising:

accessing a database to obtain a further IP address for a designated controller in said particular PBX for which the IP device has been programmed, and redirecting said IP device to establish a connection with said designated controller for registering said IP device therewith;

wherein said accessing said database includes: reading a cluster element ID from a remote directory number (DN) table in said database using a software ID supplied by said IP device as a key, wherein said cluster ID identifies one of said clusters within said network containing said designated controller; reading a PBX signalling ID from a cluster table using said cluster element ID as a key, wherein said PBX signalling ID identifies one of said multiple PBXs within said one of said clusters containing said designated controller; and reading said further IP address for said designated controller from a PBX controller table using said PBX signalling ID as a key.

3. The improvement of claim 1, wherein said database is replicated in each of said multiple PBXs.

4. The improvement of claim 2, wherein said database is replicated in each of said multiple PBXs.

* * * * *